United States Patent Office 3,573,927
Patented Apr. 6, 1971

3,573,927
METHOD AND PRODUCTS OF PROCESSING
RAW MAPLE SAP
Raymond S. Nessly, 144 N. Marshall St.,
York, Pa. 17402
Continuation-in-part of abandoned application Ser. No. 500,788, Oct. 22, 1965. This application June 4, 1969, Ser. No. 834,204
Int. Cl. A23l 1/00
U.S. Cl. 99—28                                    6 Claims

ABSTRACT OF THE DISCLOSURE

Raw acidic maple sap is heated to produce a product having a pH of between 7.5 and 8.0. Characteristics of the product can be varied by blending with quantities of other prepared maple sap products.

Figure 1:
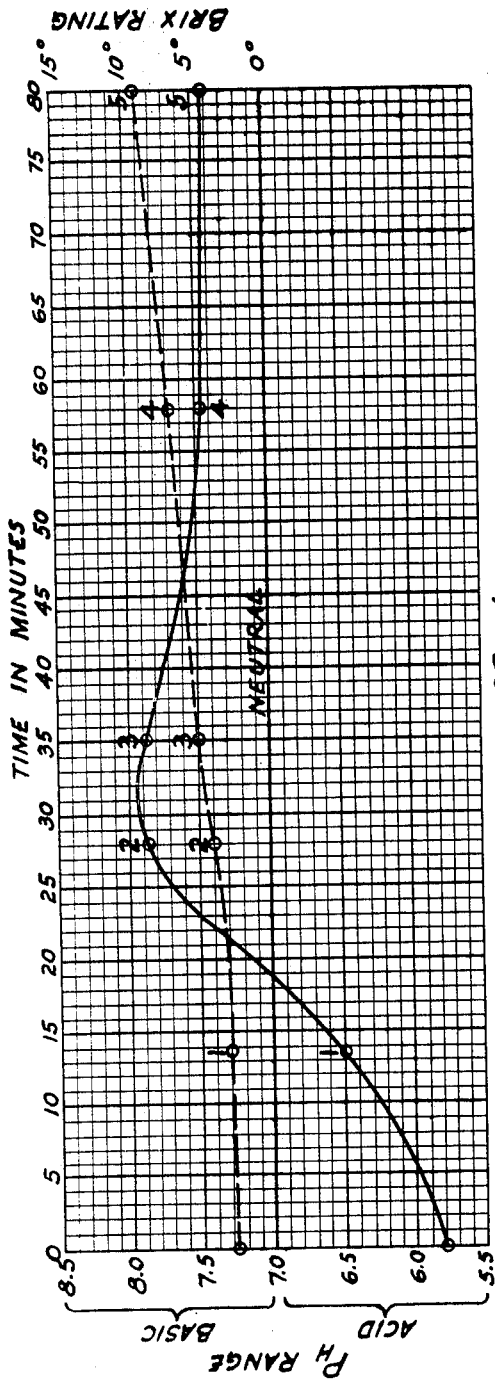

This application is a continuation-in-part of application Ser. No. 500,788, filed Oct. 22, 1965, now abandoned.

BACKGROUND OF THE INVENTION

This invention pertains to a method of producing, from raw maple sap, maple products intended for human consumption and particularly being suited for use as a beverage, flavoring, or as an additive to various kinds of food products, and the like. To a substantial extent, the present invention comprises an improvement over the process used to form the product comprising the subject matter of applicant's prior Pat. No. 3,397,062, dated Aug. 13, 1968, and the products resulting therefrom. More particularly, the present invention comprises the results of scientific research and determination of physical and chemical properties, and the development of preferred methods and means of controlling such methods to obtain the same to produce, for example, the products described in said prior patent, as well as other products described hereinafter.

The products described in said prior patent and the preferred methods of producing the same as determined by the subject matter of the present invention offers a broad, new field for the utilization of raw maple sap, particularly in fields not previously explored or utilized. As described in detail in said prior patent, the principal present uses for the raw sap of the maple trees comprise only maple syrup and the further processing of such syrup into crystalline stage to form maple sugar. Until the advent of said prior patent, no previous efforts are known wherein a maple product was produced having a Brix rating less than that of maple syrup or a pH other than approximately 7.0, or neutral.

For purposes of ready reference and especially to contrast the present invention over the relatively limited knowledge presently existing with respect to known utilization of raw maple sap and the conventional products resulting therefrom comprising maple syrup and maple sugar, it is submitted to be a well-known fact that the gathering of raw maple sap and the processing of the same into syrup and sugar, particularly in regard to the man hours of energy required to accomplish the same, when considered in relation to the selling prices of the products, is such that the present industry, understandably, is decreasing due to being unattractive to persons to become interested in it who have not previously been engaged in the same.

One of the principal known facts about the maple syrup and sugar industry is that, for maple syrup to be acceptable to the trade and also to conform to established standards which are under federal regulations, the syrup must possess a Brix rating of between substantially 65.5° and 67°, the same being a measurement of the so-called density and corresponding sweetness of the syrup and also being somewhat of an index of the amount of solid materials such as minerals, as well as sugars, that are in solution in the syrup. The pH is approximately neutral.

There are two types of maple sap. One is known as the growing or summer sap which, if processed, does not develop a maple flavor, syrup or sugar. This sap develops in the trees from the first formation of buds and leaves in the spring season and remains until the leaves have fallen in the following fall season. Traces persist until hard freezing temperatures occur.

The second type is known as winter, hibernation or neutrient sap. It contains all the essential substances which, when heated and evaporated, develop in the form of maple flavor and sugar, or Brix content. Until heat is applied, no maple flavor is present. This type of sap exists in the trees from the time the leaves have fallen in the fall season, when the tree enters its hibernation cycle, which cycle ends during the warming period in the spring season, when the leaf and blossom buds begin to form or swell. At this time, the summer or growing sap begins to intrude upon the winter sap. When this occurs, the production of maple products must cease because the summer sap imposes a foul odor and objectionable flavor upon any product resulting from heating the sap. Also, the sugar content practically disappears.

The raw winter sap is a bland, clear, thin and very slightly sweet liquid, mildly acid, and contains a substantial number of mineral compounds having beneficial nutritional value but no maple flavor. The chemical nature is such that, when heat is applied, and especially when boiling is induced, excess water in the sap is evaporated. Such heating also develops the characteristic maple flavor and evaporation of the excess water concentrates the sugar of Brix content which also increases the viscosity. If heating is continued long enough, the Brix content of the product rises to between 65.5° to 67°, which comprises commercial type maple syrup.

Such raw winter sap is a fragile or delicate liquid. It provides a natural culture for bacterial growth, whereby it can ferment and sour in less than 24 hours. Thus, the raw sap normally must be rushed to the evaporators for processing into syrup and maple sugar. Only at the high viscosity of maple syrup is the product stable to resist spoilage.

The very watery natural maple winter sap, as it comes from the tree, has an acid pH value which may be anywhere between 5.5 and 6.5. It varies substantially between trees and between seasons. Such sap has only a very low Brix rating which ranges within the vicinity of between 1.5° and 5° or 6° but most frequently averages around 2° or 3°. To concentrate this to acceptable maple syrup, the sap must be boiled appropriately and, for example, about 43 gallons of raw sap having a Brix value or rating of about 2°, is required to make a single gallon of syrup having a Brix rating of between 65.5° and 67°. The maple flavor develops gradually as the boiling progresses.

Usually, about ninety minutes are required to evaporate a given quantity of this type of raw sap to acceptable syrup consistency, flavor and color. During this time, he pH increases, usually becoming alkaline and then decreasing to neutral in the syrup product. The great majority of the water content of the original raw sap should be evaporated during the first thirty minutes of this period, at which time the residue comprises about two gallons of partially prepared syrup having a Brix rating of approximately 45°. To prevent burning and the production of an undesirable rather dark color in the syrup products, about one hour is required thereafter to remove the last gallon of water from said two gallons of partially prepared syrup and thus produce one gallon of final syrup. The process thus is very time-consuming and tedious. Such extensive boiling also removes a high percentage of natural, healthful minerals in the form of "sugar sand."

As has been indicated above, the only known products which have thus far ever been made from raw maple sap are conventional maple syrup having a Brix rating of between 65.5° and 67°, and maple sugar. The intensity of flavor in maple syrup has been increased by procedures described in U.S. Pats. Nos. 2,054,873 and 2,715,581. Other variations in making syrup are described in U.S. Pat. No. 2,718,469. The entire syrup-making procedure and properties of sap are described in U.S. Dept. of Agriculture Handbook No. 134, dated January 1958, pages 12–17, 36 and 37. Nothing is suggested in any of this material about any maple products of the type to which the present invention pertains.

As has been described and claimed to a limited extent in said aforementioned prior patent of the applicant, he has discovered a number of new products, principally of a beverage and flavoring type, which can be formed from raw maple sap and which products are much less tedious to produce than maple syrup or crystallized maple sugar. Similarly, much less fuel, since time and effort are required to produce the same than for making conventional maple syrup or sugar. For purposes of facilitating the manufacture of such products, however, the present invention has resulted from experimentation with and scientific research into certain physical and chemical properties and processes in an effort to produce said products with greatest efficiency and minimum controls, labor and fuel consumption, as well as to establish certain guiding criteria to facilitate following such processes.

SUMMARY OF THE INVENTION

It is the principal object of the present invention to provide a relatively simple procedure for converting raw maple sap into highly useful and desirable liquid maple products which principally are of either a beverage-type or are useful as flavoring materials of various kinds in a number of different types of food-stuffs, simply by observing only the pH change which is produced by heating the raw sap and discontinuing said heating when the desired pH is attained to develop a product having palatable zestful astringency or a sudsy or frothy nature, as desired.

It is another object of the invention to provide a simple process for producing a maple beverage or flavoring type product having a pH rating within the range of substantially between 7.5 and 8.0, regardless of the Brix rating, as to provide either a highly desirable maple beverage product and/or flavoring material having a highly palatable and desirable maple flavor of acceptable sweetness and zestful astringency or frothy nature which result particularly from the higher pH rating than exists in conventional maple syrup. Further, a high percentage of the natural minerals remain in the product thus produced, thereby increasing the healthful benefits thereof.

It is a further object of the invention to provide several processes whereby raw maple sap may be boiled, selectively, either rapidly or slowly, by using respectively relatively high or lower heat to evaporate some of the original water content of the sap quickly until the pH range of between 7.5 and 8.0 is attained, and then stopping such heating. If the resulting product is found to be deficient in any desired characteristic, supplementing previously prepared maple products having a great intensity of such desired characteristics may be added in suitable proportions until a desired product is obtained.

Details of the foregoing objects and of the invention, as well as other objects thereof, are set forth in the following specification and illustrated in the accompanying drawing comprising a part thereof.

In the drawing:

FIG. 1 is a graph illustrating results of processing one batch of sap having a predetermined depth and at a predetermined temperature.

Figure 2:
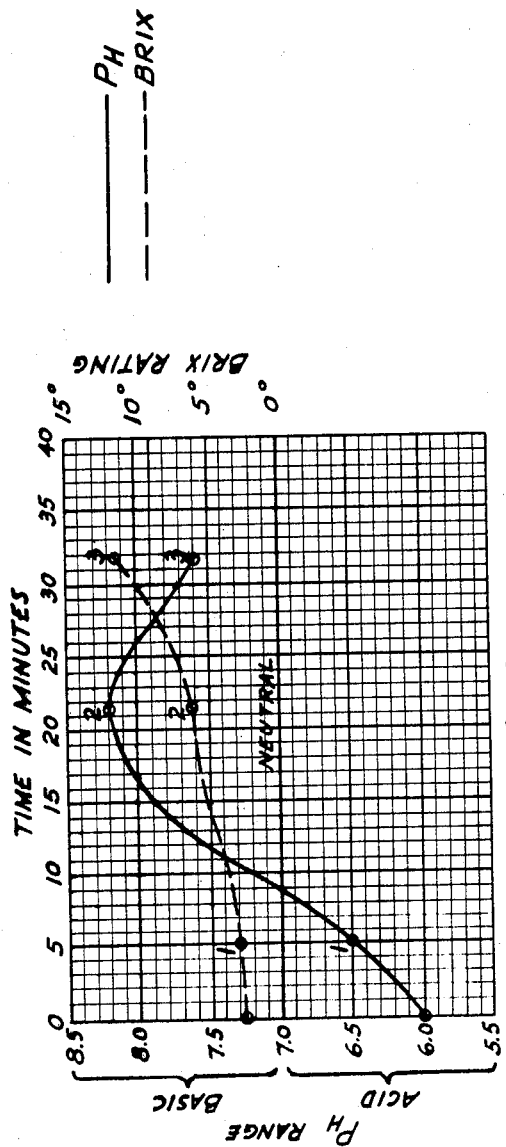

In FIG. 2 is a graph illustrating results of processing another batch of sap at the same temperature as in FIG. 1 but having a lesser depth.

In accordance with the research and development which has been undertaken incident to developing the procedure and controls comprising the subject matter of the present invention, it has been found that, regardless of the Brix value, or rating, of raw maple sap and products resulting therefrom, the raw maple sap is slightly acid, the pH rating thereof being substantially within the range of approximately between 5.5 and 7.0. Just as the average Brix rating of raw maple sap substantially varies between different seasons, different geographical localities, different soils, and between even closely adjacent trees as well as at different times of the day from the same trees, the pH value or rating thereof also will vary in the same way and such variation will occur nearly always between successive batches of raw sap gathered to be processed.

It also has been found that as raw maple sap is subjected to evaporation by heat, the pH value or rating will increase from an acid range, usually relatively early in the process, passing the neutral stage and, as can be seen from FIGS. 1 and 2, becomes definitely basic or alkaline, after which the pH decidedly decreases and, as the viscosity and corresponding Brix rating increases, the pH will ultimately closely approach or reach neutral, or 7.0. If processing continues to where the Brix value approaches that required for syrup, i.e., within the 65° to 67° range, the product will be substantially neutral. As heating proceeds, the intensity of the maple flavor also increases.

It also has been found that, particularly for beverage use, while a partially concentrated maple sap having a Brix value or rating between substantially 8° and 12° possesses adequate sweetness and maple flavor, unless the pH value is substantially within the range between 7.5 and 8, for example, the beverage does not possess several desirable properties which have been discovered. One is what is described as a zestful property which is believed to result from an astringent effect provided by the pH value within the aforementioned range. If the pH is appreciably higher than 8.0, the product usually does not leave a pleasant aftertaste in the mouth. This zestful effect is rendered apparent and is even more palatable to the average human taste when the beverage is carbonated appropriately.

The additional desirable properties or characteristics which have been found to be present in the maple sap when processed and controlled in accordance with the principles of the invention are illustrated in the exemplary graphs included in FIGS. 1 and 2. It will be seen that the raw sap initially has a pH below 7.0, whereby it is slightly acid. The batches processed respectively to provide the data for said graphs were different. Thus, the initial pH of each batch are inherently different. As heating proceeds the pH ascends above 7.0 in both graphs and passes above the 7.5–8.0 range, after which it starts to descend and again passes through the 8.0–7.5 range.

It is possible to stop the processing when the pH is ascending and while within approximately the 7.5–8.0 range. The resulting product is frothy or sudsy in nature but leaves a smooth and pleasant aftertaste in the mouth. It may be pasteurized and bottled to maintain it in this state. If, however, the processing is continued until the pH is descending and heating is stopped within the 8.0–7.5 range, the product has an astringency property which gives zest to the taste or flavor thereof that is different from the product described above in which processing is stopped while the pH is ascending. In any event, two somewhat different, desirable maple products are provided.

To further explain the differences between the graphs in FIGS. 1 and 2, as indicated above, two different batches of raw sap were processed at the same temperature but the depth of the sap in the heating pan to produce the graph in FIG. 1 was about 3½" while the depth of the sap in the pan to produce FIG. 2 was only about 1½". Hence much more rapid processing occurred in regard to the second batch than the first. In regard to efficient processing, it is preferred in either event that flowing movement of the sap be effected since moving sap has the ability to absorb heat from the evaporating pans much more efficiently than if no movement occurs. The use of a series of connected pans with dividers therein to define connected paths, for example, is one simple means for producing movement efficiently.

In addition to a beverage or flavoring product of the type described above possessing desired astringency, or sudsy characteristics, sweetness and maple flavor to provide desired palatability, the relatively limited reduction of the raw maple sap to the consistency referred to above results in the natural minerals of the raw maple sap being retained within the product to a very high degree. In contrast to this, as described in said aforementioned patent of the applicant, when the concentration of raw maple sap approaches or reaches syrup consistency, a very large percentage of the natural minerals are precipitated from the product in the form of what is known in the maple syrup industry as "sugar sand" which, in appearance, often resembles normal beach sand.

This precipitate is always filtered from the syrup product and is discarded as a waste material because of the difficulty of finding suitable uses therefor, particularly since the same is only rendered soluble in water to a very limited extent and thus is not readily capable of being placed in solution. It is wellknown, however, that many of the minerals contained in such "sand" are highly beneficial to the human system and the beverage-type product or flavoring material of the present invention within the pH ranges stated above retains the vast majority of these natural minerals in solution within the product resulting from such process.

The preferred procedure by which production of a desired product of the type referred to is undertaken consists of the following general steps. The initial temperature and pH value of a raw sample of maple sap to be processed in accordance with the invention are determined. Under some circumstances, it may be desirable to regulate the depth of the sample in open evaporator pans which may be of the conventional type presently employed or a connected series of the same as referred to above. These afford relatively substantial horizontal surface areas from which the excess water in the raw sap is to be evaporated. It is understandable that the deeper the volume of sap within the pan, either a greater length of time will be required to produce a desired result or a greater heating temperature should be employed than where a volume of less depth is introduced to the pan for treatment.

One of the principal objectives of the present invention is to produce a maple product having a desired pH rating within the range specified above by boiling the raw sap under the most favorable conditions, either by a batch-type or a continuous process, to produce the same. It is only necessary, under the circumstances, to observe the pH value of the batch periodically as it is being processed. In this respect, the process of the present invention distinguishes markedly from conventional procedures for making maple syrup. Almost anybody with substantially no training can make maple syrup even with crude equipment. The Indians made it long before the days of Columbus. But the present process requires scientific knowledge and equipment and requires frequent testing of pH values at many different localities in the evaporating system.

The Brix rating, so to speak, falls where it will. It actually is of secondary interest and importance and it is also in this respect that the present invention differs from what has been known about and practiced heretofore in processing raw maple sap to form maple syrup. In making syrup, the Brix rating is all-important and when it reaches between 65.5° and 67°, the processing is stopped. Meanwhile, the pH has been totally disregarded because it is completely unimportant in making syrup. It is neutral, 7.0 pH, in average syrup. Thus, there is no need to observe it or test for it either before, during, or after the boiling procedure. In contrast to normal syrup making, however, the pH rating of the batch is of the greatest importance. The operator must decide, however, whether to stop the procedure while the pH is ascending or descending so as to produce the desired product of the two possibilities described above.

After the desired pH range has been produced in a batch of sap, the Brix rating then is determined. If it is not high enough for a desired product, or if the maple flavor is not sufficiently intense, the batch is fortified either by adding portions of other batches which may have a higher Brix rating or more intense flavor in required amounts to produce desired results or by adding maple syrup in required amounts. The pH should not be reduced significantly by such fortifying or the desired astringency or sudsy characteristic, as the case may be, will be reduced or destroyed. Batches of raw sap may be processed to provide so-called stock material having known tested pH ratings and Brix values, etc., of suitable ranges, for example, for such blending purposes.

Reduction of the raw sap in as short a time as possible also is especially advantageous if the original pH value of the raw sap is higher than average. Such rapid condensation of the raw material prevents undue chemical action which occurs during the boiling of the material. For example, during such boiling, various acids are formed which disappear in later stages of the process. Further, by reducing the volume of the raw material to only approximately half if its original volume in arriving at a desired product of the type described above, such as has a pH of between 7.5 and 8.0, only minimal precipitation of mineral contents of the raw sap occurs in the form of "sugar sand" whereby the vast majority of such natural minerals and other beneficial chemical compounds within the raw sap remain within the completed product so as to benefit the ultimate consumer physically.

Therefore, in accordance with the present invention, raw sap is boiled either at a relatively fast rate or slow rate, as desired, depending upon the depth of the sap in the pans and the available heating equipment. The initial pH and temperature of the raw sap are determined. By reference to the graphs of either FIGS. 1 or 2, it will be seen that when the pH value is found by periodic testing to be within the acceptable maximum and minimum desired range, the heating and boiling of the sap is discontinued. This minimizes the consumption of fuel and further precipitation of natural minerals. Under such circumstances, if the flavor, zestful astringency, or Brix content is not acceptable, modification of the condition is undertaken such as by blending with the resulting product necessary amounts of either previously processed sap which has a different pH value and/or different astringency or Brix value. If expedient, it may only be necessary to add a required, and usually small, amount of maple syrup, if increase of the Brix value of the batch of sap being processed is required to bring the Brix value to the desired range or amount.

By way of specific example, assume that a certain batch of raw sap being processed in accordance with the preferred procedure has a pH value of 7.7 and the Brix value is only 6°. The flavor is weak. Such batch readily can be fortified to increase the Brix rating to 10°, for example, simply by the addition of a relatively small proportion of either normal or a high flavored maple syrup.

As a further example, assume that a batch of raw sap has been processed until it is found that the Brix value has reached approximately 10°. The pH value, however, is low, being only 7.3, for example, whereby the astringency is a little weak. To increase the pH value, the procedure proposed by the present invention would be to blend with said batch the required amount of previously prepared sap which, for example, has an acceptable Brix rating, while the pH value thereof is somewhat higher than 8.0, for example.

The procedure and control principles of the invention therefore encompass instrumentation, observation, and controlling the heat, either with or without regulating the liquid depth in the processing pan or container, all of such operations being in a range or area of little or no concern in the processing of maple sap to form conventional maple syrup.

Although the above description and the specifically illustrated data included in the several figures of the drawing have pertained to the formation of a beverage-type maple product or a maple flavoring product having certain specified preferred ranges and optimum pH value of the prepared material, it is to be understood that these primarily are exemplary and not restrictive. By way of further example, either a beverage product or a maple flavoring product, which can be used, for example, either as a syrup added to canned fruits or for purposes of flavoring conventional canning syrups and other foodstuffs of many kinds which are specified in detail in said aforementioned patent of the applicant, may be made by utilizing the principles of the present invention.

Under circumstances where the product is to be used either as a beverage or for flavoring purposes, especially to prevent the formation of mold or any other change in the preferred nature of the processed sap, it is preferred that the same be preserved by pasteurizing and then sealed hermetically within suitable containers. Where, for example, the processed sap also is desired especially for use as a beverage, the palatability thereof is greatly increased by carbonating the same such as by utilizing conventional carbonating equipment presently employed for soft drinks and other beverages.

While the invention has been illustrated and described in its several preferred embodiments, it should be understood that the invention is not to be limited to the precise details herein illustrated and described since the same may be carried out in other ways falling within the scope of the invention as described and illustrated.

I claim:
1. A method of producing from raw maple sap, a natural maple flavored beverage and flavoring product having desired constituent values comprising the steps of determining the initial pH value of the raw acidic maple sap, subjecting said sap to heating and evaporation by boiling to increase said pH value thereof, and discontinuing the heating when the pH reaches a range between about 7.5 and 8.0 to provide a highly palatable taste as well as a high percentage of the mineral content of the original sap.

2. The method according to claim 1 including the further step of blending with the resulting product sufficient quantities of other prepared maple sap products having the required values to fortify the constituent values produced by said procedure to produce desired Brix values and flavor in said product.

3. The method according to claim 1 in which the initial pH of the raw product is below 7.0 and the heating causes the pH to increase and including the steps of discontinuing such heating when the increasing pH is within the range between about 7.5 and 8.0 to produce a product having a sudsy and foaming characteristic producing a pleasant after-taste in the mouth.

4. The method according to claim 1 in which the initial pH of the raw product is below 7.0 and including the steps of heating the sap to increase the pH to maximum value above at least 8.0 and continuing the heating until the pH descends to within the range between about 7.5 and 8.0 when said heating is discontinued to produce a product having a zestful astringency.

5. The method according to claim 1 including the further step of regulating the depth of the sap in the heating equipment relative to the heat to effect maximum efficiency in heat consumption to produce the desired increased pH range in the product.

6. A maple beverage and flavoring product produced by the method according to claim 1.

References Cited
UNITED STATES PATENTS

| | | | |
|---|---|---|---|
| 2,054,873 | 9/1936 | Whitby | 99—142 |
| 2,715,581 | 8/1955 | Willits et al. | 99—142 |
| 2,718,469 | 9/1955 | Eskew et al. | 99—142 |
| 3,397,062 | 8/1968 | Nessly | 99—28 |

OTHER REFERENCES

Agriculture Handbook No. 134, Maple Sirup Producers Manual, U.S. Dept. of Agriculture, January 1958, pp. 12–17, 36 and 37.

MORRIS O. WOLK, Primary Examiner

S. B. DAVIS, Assistant Examiner

U.S. Cl. X.R.

99—79, 142